United States Patent

Conger et al.

[11] Patent Number: 5,730,829
[45] Date of Patent: Mar. 24, 1998

[54] TWO DRUM TURRET FOR TIRE ASSEMBLY

[75] Inventors: Kenneth Dean Conger, Stow; Dean Charles Testa, Akron, both of Ohio

[73] Assignee: The Goodyear Tire & Rubber Company, Akron, Ohio

[21] Appl. No.: 622,087

[22] Filed: Mar. 26, 1996

[51] Int. Cl.$^6$ .................................................. B29D 30/24
[52] U.S. Cl. ................................................ 156/396; 156/414
[58] Field of Search ............................. 156/396, 394.1, 156/406.2, 414, 130, 133, 111

[56] References Cited

U.S. PATENT DOCUMENTS

| | | | |
|---|---|---|---|
| 3,717,529 | 2/1973 | Rattray et al. | 156/396 |
| 3,909,337 | 9/1975 | Yabe | 156/416 |
| 4,134,783 | 1/1979 | Appleby et al. | 156/396 |
| 4,197,155 | 4/1980 | Hursell, Sr. | 156/396 |
| 4,753,707 | 6/1988 | Crombie | 156/396 |
| 4,985,100 | 1/1991 | Sasaki et al. | 156/396 |
| 5,031,478 | 7/1991 | Becker et al. | 74/821 |
| 5,399,225 | 3/1995 | Miyamoto et al. | 156/396 |
| 5,540,803 | 7/1996 | Miyamoto et al. | 156/396 |

FOREIGN PATENT DOCUMENTS

| | | | |
|---|---|---|---|
| 3-114737 | 5/1991 | Japan | 156/396 |
| 504674 | 3/1977 | U.S.S.R. | 156/396 |
| 682389 | 8/1979 | U.S.S.R. | 156/396 |

*Primary Examiner*—Geoffrey L. Knable
*Attorney, Agent, or Firm*—Frederick K. Lacher

[57] ABSTRACT

A turret for a tire building system having two drums with drum shafts mounted on the turret and adjusted so that the axes of the drum will be offset and parallel providing a compact turret assembly with a minimum shaft length and weight. The offset drum shafts provide for positioning of the drums in operating positions of different heights relative to the floor surface so that manual operations can be carried out at the lower drum position where there is easy access by an operator. Safety provisions are incorporated to disengage the motor and stop rotation of the turret if the motor does not stop and thereby protect the operator and the turret mechanism.

10 Claims, 2 Drawing Sheets

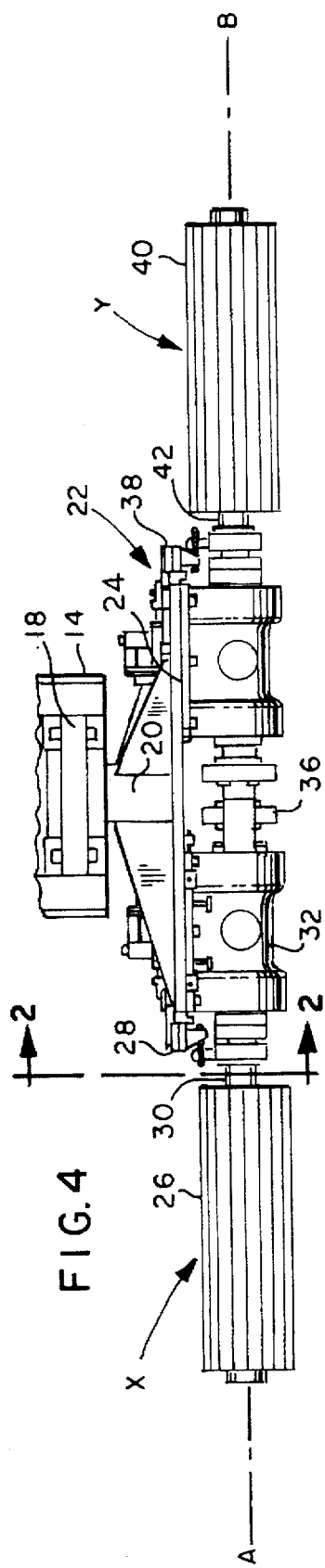
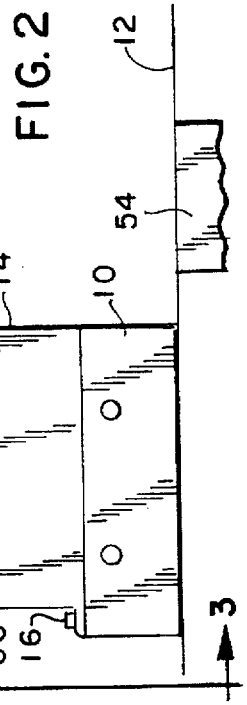
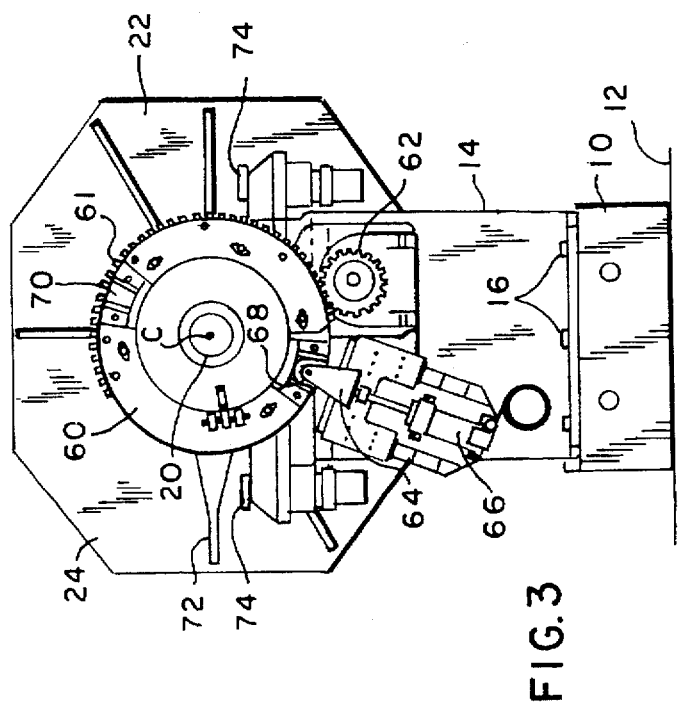

TWO DRUM TURRET FOR TIRE ASSEMBLY

Turrets having two drums have been designed for tire building machines heretofore to provide for the assembly of tire components and performing other tire building operations at two different positions. Where the drums have been rotated 180 degrees from a first position to a second position a deep pit has been required in the floor so that the drums will be at a suitable height above the floor for performing manual tire assembly operations. When the drum shafts have been coaxial a reinforced turret construction has been required to support the weight of the drums to be carried at substantial distances from the axis of rotation of the turret determined by the length of the drum shafts.

Heretofore, rotation of the turret, including the drums and ancillary equipment has been stopped when the actuating motor has been stopped. The turret was then locked in position by braking grips urged into engagement with slots in a disc connected to the shaft rotating the turret. No provisions were made for disengaging the turret from the motor to stop the turret if the motor does not stop. This is important when the turret rotary parts may weigh as much as 6,000 pounds.

In accordance with the present invention, a two drum turret is provided having drums rotatable about offset parallel axes. With this construction the length of the shafts supporting the drums is minimized so that a compact turret of minimum weight may be used to support the drums. Also the offset drums provide for positioning one of the drums at a height lower than the other drum which is desirable for operator access to the drum in the lower position. Safety features are also incorporated in that if there is overtravel of the turret, the motor drive pinion will be disengaged from the semi-circular gear rack and movement of the turret will be stopped by a shock absorber. With the offset axis two drum turret of this invention, the depth of the pit in the floor is minimized and different height working positions of the drums are made possible for increased efficiency.

In accordance with one aspect of the invention there is provided a tire building apparatus comprising a turret rotatable about a turret axis, a first drum extending outwardly from a first side of said turret and rotatable about a first axis, a second drum extending outwardly from a second side of said turret and rotatable about a second axis parallel to and spaced from the first axis and means to rotate the turret to move the first drum from a first position at a first height to a second position at a second height and move the second drum from the second position to the first position providing access to the first drum and second drum by an operator at the first height for tire component applications at a lower height above a floor surface.

In accordance with another aspect of the invention there is provided a method of assembling tire components on a turret comprising:

(a) applying initial tire components on a first turret mounted drum at a first position having a first height above a floor surface, (b) rotating the turret to transfer the first drum and the tire components to a second position at a second height above the floor surface, (c) simultaneously with the application of the additional tire components on the first drum at the second position applying tire components on a second turret mounted drum at the first position; and (d) removing the tire assembly from the first drum.

To acquaint persons skilled in the arts most closely related to the present invention, a certain preferred embodiment thereof illustrating a best mode now contemplated for putting the invention into practice is described herein by and with reference to the annexed drawings forming a part of the specification. The embodiment shown and described herein is illustrative and as will become apparent to those skilled in these arts can be modified in numerous ways within the scope of the invention defined in the claims hereof.

In the Drawings FIG. 1 is a front elevation of a two drum turret assembly embodying the invention.

FIG. 2 is a side elevation of the turret assembly taken along line 2—2 in FIG. 1 with the drums removed.

FIG. 3 is a rear elevation of the turret assembly taken along line 3—3 in FIG. 2 with parts being broken away.

FIG. 4 is fragmentary top view of the turret taken along line 4—4 in FIG. 1.

Figure 1:
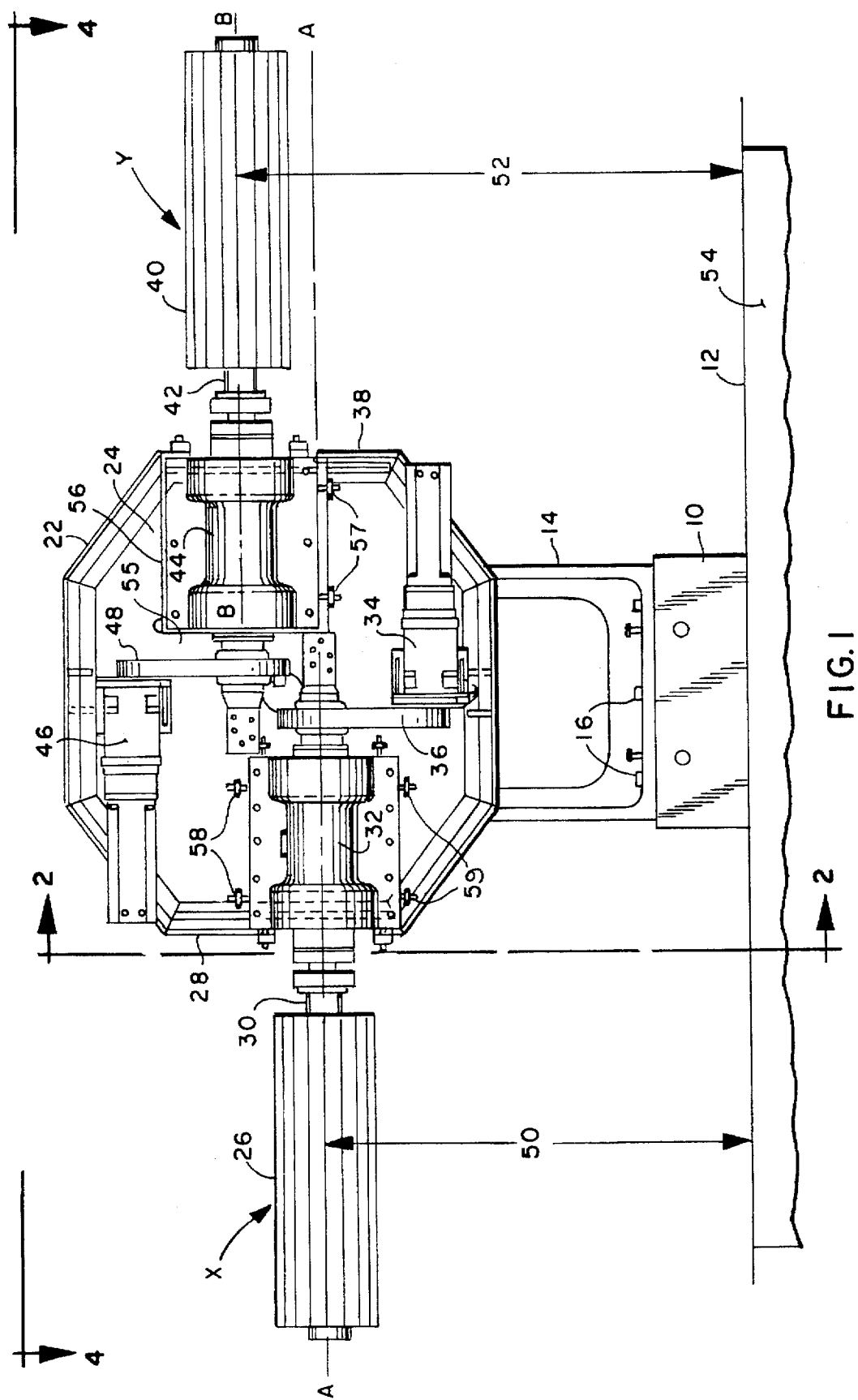

With reference to FIGS. 1, 2 and 3 a base 10 is shown mounted on a floor surface 12 and fastened to a turret support housing 14 by bolts 16 or other suitable fasteners. Pillow blocks 18 are mounted on the housing 14 providing bearings for supporting a turret drive shaft 20. A turret 22 is mounted on one end of the shaft 20 and includes a turret supporting plate 24.

Referring to FIGS. 1 and 4 a first drum 26 is rotatably mounted on the turret supporting plate 24 and extends outwardly from a first side 28 of the turret 22 for rotation about an axis A—A in a first position X. The first drum 26 is also known as a slave drum and is mounted on a slave shaft 30 rotatably supported in a slave bearing 32 mounted on the supporting plate 24. A slave drum drive motor 34 is also mounted on the supporting plate 24 and is in a driving relationship with the slave shaft 30 through a slave belt 36 extending around pulleys mounted on the slave shaft 30 and shaft of the slave drum drive motor 34.

Mounted on the second side 38 of the turret 22 is a second tire building drum 40 rotatable about a second axis B—B in a second position Y. The second tire building drum 40 which is also known as the master drum is mounted on a master shaft 42 supported in a master bearing 44 mounted on the supporting plate 24. The master shaft is driven by a master drum drive motor 46 mounted on the supporting plate 24 and connected by a master belt 48 to the master shaft through drive pulleys.

As shown in FIG. 1 the axis A—A of the first drum 26 and the axis B—B of the second drum 40 are in parallel relationship so that in the operating position the first drum 26 is at a first height 50 of about 40 inches (101.6 cm) above the floor surface 12 which is less than a second height 52 of about 50 inches (127 cm) of the second drum 40 above the floor surface. This is important in that when manual operations for applying the tire components to the drum 26 are required the drums 26 and 40 need to be close to the floor surface 12 in order that the operator can reach the drums.

In addition to the axes A—A and B—B being parallel the turret construction provides for offsetting of the slave shaft 30 from the master shaft 42 which minimizes the distance the first drum 26 and second drum 24 extend outwardly from the first side 28 and second side 38 of the turret. This configuration reduces the space required for rotation of the turret 22 and the depth of a pit 54 necessary to permit rotation of the turret about the axis of the turret drive shaft 20.

It is important for effective operation of the two drum turret assembly of this invention that the first drum 26 and second drum 40 have axes A—A and B—B which are symmetrical about axis C—C of the turret driveshaft 20. In accordance with the invention the master bearing 44 is mounted on the supporting plate 24 in a predetermined position. This is accomplished by urging the edges of the master bearing 44 against registers 55 and 56 on plate 24 with adjusting screws 57 threaded in the plate. Then the position of the slave bearing 32 is adjusted by adjusting screws 58 and 59 threaded on the plate 24 so that the axis A—A of the first drum 26 is parallel with axis B—B of the second drum 40 as well as being symmetrical about axis C—C of the turret drive shaft 20. With this adjustment the first drum 26 and second drum 40 will be in identical positions when the first position X and the second position Y so that tire components applied to the drums are applied in identical positions regardless of which drum is in a particular position.

Referring to FIGS. 2 and 3 a drive gear 60 is mounted on the rear end of the turret drive shaft 20.

The drive gear 60 has a semi-circular gear rack 61 engageable by a pinion gear 62 driven by a turret drive motor 63 mounted on the housing 14. Referring to FIG. 3 the drive gear 60 is rotated from the position shown in FIG. 3 in a clockwise direction 180° so that the turret supporting plate 24 as shown in FIG. 1 will rotate 180° in a counter clockwise direction moving the first drum 26 from the first position X shown in FIG. 1 to the second position Y shown in FIG. 1 and moving the second drum 40 from the second position Y shown in FIG. 1 to the first position X shown in FIG. 1. In the two operating positions X and Y a cam roller 64 actuated by a pneumatic lock 66 extends into a tapered slot 68 or slot 70 at the operating positions of the turret 22 to lock the turret in an operating position.

In the event the motor 63 does not stop to permit actuation of the cam roller 64 by the pneumatic lock 66 the length of the semi-circular gear rack 61 is predetermined for disengaging the pinion 60 whereupon the shaft 20 will continue to rotate and arm 72 mounted on the shaft and extending outwardly therefrom is positioned to engage shock absorbers 74 mounted on the housing 14. One of the shock absorbers 74 is provided at each side of the housing 14 to limit the rotation of the turret supporting plate 24 in either direction by engagement with the arm 72.

In a typical tire building operation tire components may be applied to the first drum 26 and the second drum 40 by rotating the drums through actuation of the slave drum drive motor 34 and master drum drive motor 36 in response to suitable controls connected to the motors. After application of the tire components the cam roller 64 may be released and the turret drive motor 63 actuated in response to suitable controls for rotating the turret 22 180° whereby the first drum 26 is moved to the second position Y and the second drum 40 is moved to the first position X as shown in FIG. 1. Simultaneously with the application of additional tire components on the first drum 26 in the second position Y at the second height 52 tire components may be provided on the second tire building drum 40 in the first position X as shown in FIG. 1. It is understood that the first drum 26 and second drum 40 are identical however drums of different sizes and types may be substituted for these drums and be adaptable for different tire building operations.

While a certain representative embodiment and details have been shown for the purpose of illustrating the invention it will be apparent to those skilled in the art that various changes and modifications may be made therein without departing from the scope of the invention.

What is claimed is:

1. Tire building apparatus comprising a turret having a master drum and a slave drum, a turret support housing, a turret shaft rotatably mounted on said housing and connected to said turret, said master drum being rotatably mounted on said turret for rotation about a master axis at a first side of said turret, said slave drum being rotatably mounted on said turret for rotation about a slave axis at a second side of said turret, turret power means to engage and rotate said turret shaft a predetermined angular distance, shock absorber means to stop rotation of said turret after rotation beyond said angular distance, said turret shaft being disengage from said turret power means after rotation beyond said predetermined angular distance, and said shock absorber means being positioned between said turret support housing and said turret shaft for engagement with said turret after disengagement of said turret shaft from said turret power means to limit the movement of said turret.

2. Apparatus in accordance with claim 1 wherein said turret power means comprises a semi-circular gear rack with a length equal to an angular distance of 180° and engageable with a pinion gear of a drive motor mounted on said housing.

3. Apparatus in accordance with claim 1 wherein said shock absorber means includes an arm mounted on said turret shaft extending radially outward from said shaft and engageable with a cushion member mounted on said housing.

4. Tire building apparatus comprising a turret having a master drum and a slave drum, a turret support housing, a turret shaft rotatably mounted on said housing and connected to said turret, said master drum being rotatably mounted on said turret for rotation about a master axis at a first side of said turret, said slave drum being rotatably mounted on said turret for rotation about a slave axis parallel to and spaced from said master axis at a second side of said turret, master drum power means to rotate said master drum mounted on said turret, slave drum power means to rotate said slave drum mounted on said turret, turret power means to engage and rotate said turret shaft a predetermined angular distance and then disengage from said turret shaft beyond said angular distance, shock absorber means to stop rotation of said turret after rotation beyond said angular distance, and said shock absorber means being positioned between said housing and said turret shaft for engagement with said turret after disengagement of said turret shaft from said power means to limit the movement of said turret.

5. Apparatus in accordance with claim 4 wherein said turret comprises a turret plate mounted on said turret shaft, a slave bearing mounted on said turret plate for a slave drum shaft connected to said slave drum and master bearing mounted on said turret plate for a master drum shaft connected to said master drum with said master drum power means connected to said master drum shaft.

6. Apparatus in accordance with claim 5 wherein said master bearing has edges for registering with register surfaces on said turret plate and master bearing adjusting screws threaded on said turret plate for urging said master bearing into registry with said edges; and slave bearing adjusting screws engageable with said slave bearing to adjust the position of said slave bearing so that said axis of said master bearing is parallel to said axis of said slave bearing and symmetrical about an axis of said turret shaft.

7. Apparatus in accordance with claim 4 wherein said turret power means comprises a semi-circular gear rack with length equal a predetermined angular distance of 180° and engageable with a pinion gear of a drive motor mounted on said housing.

8. Apparatus in accordance with claim 4 wherein said shock absorber means includes an arm mounted on said turret shaft extending radially outward from said shaft and engageable with a cushion member mounted on said housing.

9. A tire building apparatus comprising a turret rotatable about a turret axis, a first drum extending outwardly from a first side of said turret and rotatable about a first axis, a second drum extending outwardly from a second side of said turret and rotatable about a second axis parallel to and spaced from said first axis, turret power means to rotate said turret a predetermined angular distance to move said first drum from a first position at a first height to a second position at a second height and move said second drum from said second position to said first position providing access to said first drum and said second drum by an operator at said first height for tire component applications at a lower height above a floor surface, motion limiting means to stop rotation of said turret after rotation of said turret beyond said predetermined angular distance, said turret power means comprising a motor having a pinion gear engageable with a semi-circular gear rack mounted on said turret and having a predetermined length, and said gear rack being movable out of engagement with said pinion gear after said turret is rotated beyond said predetermined angular distance.

10. A tire building apparatus in accordance with claim 9 wherein said motion limiting means is a shock absorber.

* * * * *